US011619085B1

(12) United States Patent
Anderson, Jr.

(10) Patent No.: US 11,619,085 B1
(45) Date of Patent: Apr. 4, 2023

(54) STAKE POST WITH LOCKING HINGE (71) Applicant: Bobby M. Anderson, Jr., Dahlonega, GA (US)

(72) Inventor: Bobby M. Anderson, Jr., Dahlonega, GA (US)

(*) Notice: Subject to any disclaimer, the term of this patent is extended or adjusted under 35 U.S.C. 154(b) by 0 days.

(21) Appl. No.: 17/828,466

(22) Filed: May 31, 2022

Related U.S. Application Data (60) Provisional application No. 63/317,212, filed on Mar. 7, 2022.

(51) Int. Cl.
*E05D 11/10* (2006.01)
*E05D 3/02* (2006.01)
*B62D 33/03* (2006.01)
*E05D 5/06* (2006.01)
*E05D 5/02* (2006.01)

(52) U.S. Cl.
CPC .......... *E05D 11/1007* (2013.01); *B62D 33/03* (2013.01); *E05D 3/02* (2013.01); *E05D 5/0207* (2013.01); *E05D 5/062* (2013.01)

(58) Field of Classification Search
CPC ...... B62D 33/037; B62D 33/03; E05D 5/062; E05D 5/0207; E05D 3/02; E05D 11/1007
See application file for complete search history.

(56) References Cited

U.S. PATENT DOCUMENTS

| 2,064,839 | A | * | 12/1936 | Kroll | E05D 11/1014 182/163 |
| 3,499,398 | A | * | 3/1970 | Murray | B65D 19/385 108/53.5 |
| 4,216,988 | A | * | 8/1980 | Weiss | B62D 33/03 296/10 |
| 4,842,317 | A | * | 6/1989 | Moore | B62D 33/037 410/94 |
| 5,509,709 | A | * | 4/1996 | Carroll | B62D 33/03 296/3 |
| 6,340,190 | B1 | | 1/2002 | Rosebrugh et al. | |
| 9,370,277 | B2 | * | 6/2016 | Weaver | A47J 47/16 |
| 9,551,921 | B2 | * | 1/2017 | Redmon | G03B 21/58 |
| 9,702,175 | B2 | * | 7/2017 | Jaworski | E05D 5/043 |
| 9,758,198 | B2 | | 9/2017 | Brown | |
| 9,932,078 | B1 | * | 4/2018 | Nehring | B60P 1/003 |
| 10,094,156 | B2 | * | 10/2018 | Jaworski | E05D 11/1007 |
| 10,118,652 | B2 | | 11/2018 | Maertens et al. | |
| 11,180,201 | B2 | * | 11/2021 | Kim | B62D 29/043 |
| 11,312,425 | B2 | * | 4/2022 | McNall | B62D 33/0207 |
| 2021/0140213 | A1 | * | 5/2021 | Bolden | E05D 15/12 |
| 2021/0221447 | A1 | | 7/2021 | McNall | |
| 2021/0260975 | A1 | | 8/2021 | Seitz | |
| 2022/0202191 | A1 | * | 6/2022 | Yi | E05D 3/02 |

FOREIGN PATENT DOCUMENTS

DE 40 38 729 A1 6/1992
WO 2013/115707 A1 8/2013

* cited by examiner

*Primary Examiner* — Victor D Batson
*Assistant Examiner* — Matthew J Sullivan
(74) *Attorney, Agent, or Firm* — Smith, Gambrell & Russell, LLP (57) ABSTRACT

A stake post having a locking hinge that enables selective movement of a gate unit between a first position in which the gate unit forms a portion of a retaining wall in cooperation with other gate units, and a second position in which the gate unit is removed from alignment with one or more adjacent gate units to thereby provide an opening through a retaining wall otherwise formed by the stake post when in the first position.

62 Claims, 10 Drawing Sheets

STAKE POST WITH LOCKING HINGE

FIELD OF THE INVENTION

The present invention relates to an apparatus and method for selectively securing and locking movable gate units onto a loading platform, such as that of a flatbed truck or trailer. In particular, the present invention is directed to stake posts having a locking hinge for use on a flatbed platform, and methods of using the same.

BACKGROUND OF THE INVENTION

Figure 1A:
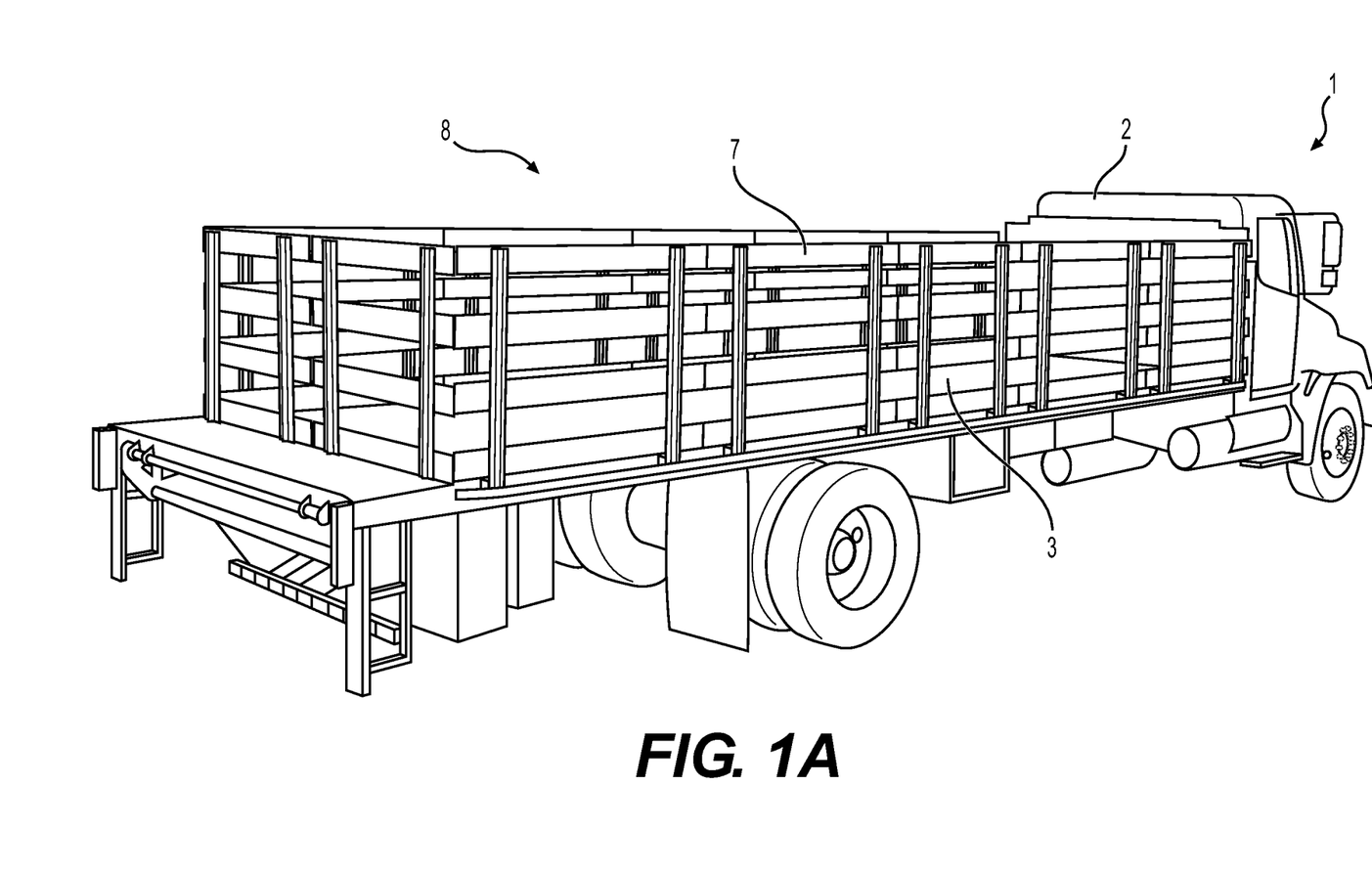
FIG. 1A shows a vehicle with a flatbed load platform and a number of gate units forming a retaining wall around the load platform.
Figure 1B:
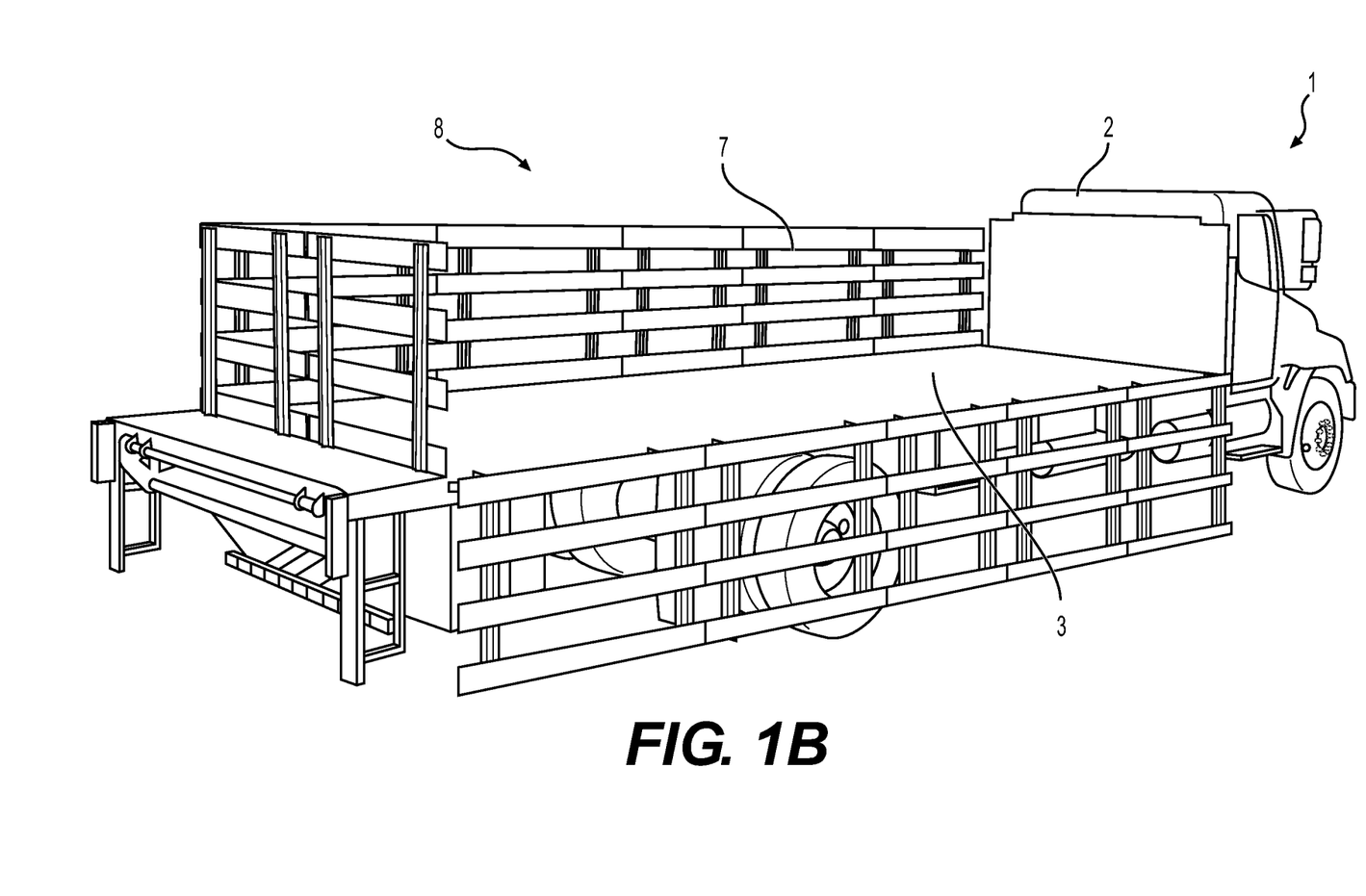
FIG. 1B shows the vehicle in FIG. 1 with the gate units along one side of the flatbed load platform rotated to a vertical downward orientation.
Figure 2:
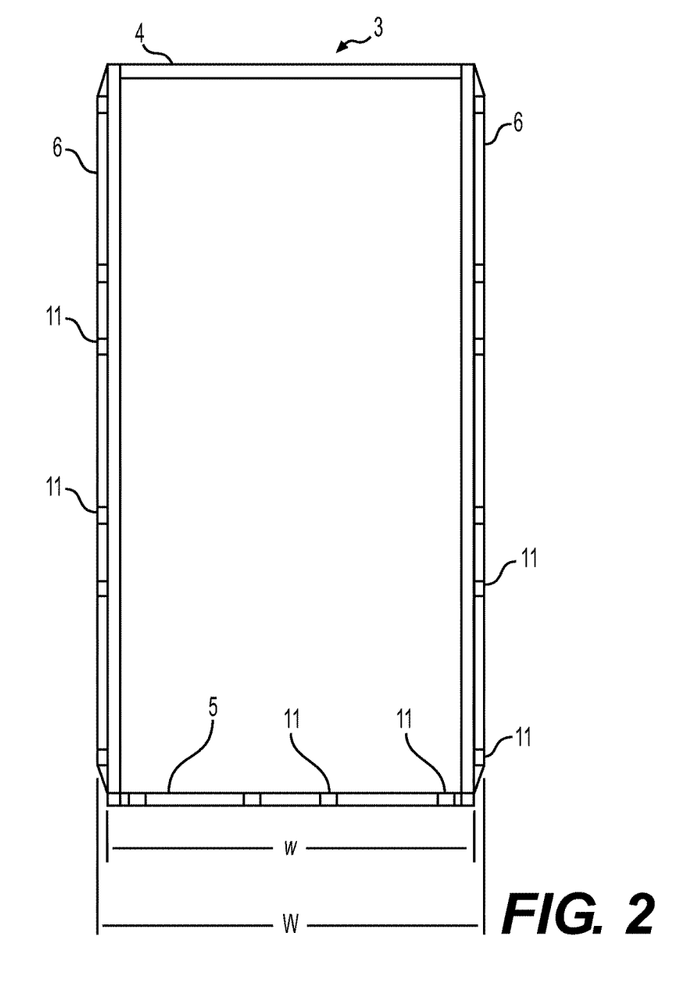
FIG. 2 presents a schematic illustration of the load platform in FIG. 1.
Figure 3:
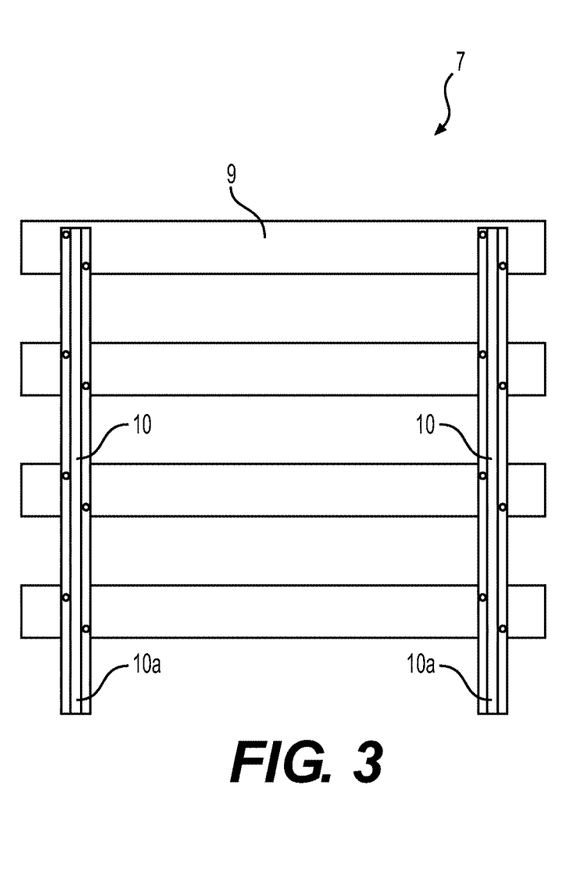
FIG. 3 shows an isolated gate unit from FIG. 1.

Conventionally, flatbed trucks and trailers have load platforms positioned rear of a passenger cabin for the carrying and transporting a load. FIGS. 1A-1B show one example of a flatbed truck 1 having a passenger cabin 2 and a load platform 3 with several gate units 7 mounted thereon. FIG. 2 shows a schematic of the load platform 3, and FIG. 3 shows a gate unit 7 in isolation. The load platform 3 has a forward cabin end 4 proximate the passenger cabin 2, a rear bumper 5 at an end opposite of the cabin end 4, and two parallel side rails 6 (a.k.a., rub rails) extend along lateral sides of the load platform, between the cabin end 4 and the rear bumper 5. A number of gate units 7 are provided and together form a retaining wall 8 around the perimeter of the load platform 3, at least along both side rails 6 and the rear bumper 5. In other examples, gate units 7 may also be provided to extend the retaining wall 8 along the cabin end 4 of the load platform 3.

The individual gate units 7 forming the retaining wall 8 include a number of slats 9 mounted horizontally on a pair of vertical stake posts 10. Commonly, the gate units 7 are made to be selectively insertable and removable from the load platform 3. This is made possible by inclusion of a number of stake pockets 11 that are positioned along the perimeter of the load platform 3 and which are configured for mating reception of lower exposed base ends 10a of the stake posts 10. The stake pockets 11 are dimensioned for reception of the base ends 10a of the stake posts 10 via vertical insertion, and adjacent gate units 10 may then be secured to one another via one or more securing mechanisms to form a retaining wall 8 around the load platform 3 for use in retaining a load on the load platform 3 during for transportation.

When seeking to remove a load from the load platform 3, a user must remove one or more of the gate units 7 from the load platform 3 to thereby form an opening in the retaining wall 8 for accessing the load retained on the load platform 3. Conventionally, removal of a gate unit 7 requires disengaging any securing mechanisms between the gate unit 7 that is to be removed and any adjacent gate unit(s) 7, and removing the gate unit 7 from the load platform 3 by lifting the gate unit 7 from the corresponding stake pockets 11. Each removed gate unit 7 is then set aside in a separate working space apart from the load platform 3 while a load is removed from the load platform 3 through an opening provided in the retaining wall 8 where the one or more gate unit(s) 7 have been removed.

Conventional gate units 7, such as those described above, present drawbacks in that removal of the gate units 7 to form an opening in a retaining wall 8 is time consuming and cumbersome. Vertical lifting to extract each individual gate unit 7 is labor intensive, and separation of the gate units 7 from the load platform 3 requires additional space for storage of each removed gate unit 7 while accessing the load on the load platform 3.

Thus, there remains a need for improvements to gate units for use with load platforms that may further ease the formation of an opening in a retaining wall formed by cooperation of several gate units, and preferably improvements that will enable quicker displacement of individual gate units with less physical exertion by a user.

SUMMARY OF THE INVENTION

The present invention is inclusive of a stake post having a locking hinge that enables selective movement of a gate unit between a first position in which the gate unit forms a portion of a retaining wall in cooperation with other gate units, and a second position in which the gate unit is removed from alignment with one or more adjacent gate units to thereby provide an opening through a retaining wall otherwise formed by the stake post when in the first position.

The present invention is further inclusive of methods of using stake posts according to the present invention, as well as gate units, load retention systems, load platforms, and vehicles comprising a stake post according to the present invention, and methods of using each.

A stake post is provided for use in securing a load on a flatbed platform, the stake post comprising a lower body component adapted for selective insertion into and removal from a stake pocket on a flatbed platform; an upper body component joined and rotatable relative to the lower body component; and a hinge configured to enable rotation of the upper body component about a rotation axis and relative to the lower body component, the upper body component being rotatable between a first position and a second position.

The hinge may be a locking hinge adapted for locking the upper body component in the first position and selectively releasing the upper body component for rotation to the second position. The rotation axis about which the upper body component rotates is secured in an upper region of the lower body component, at a location inset from a forward edge of the lower body component, such that the rotation axis does not define an outer perimeter of the lower body component. The locking hinge is configured to enable rotation of the upper body component relative to the lower body component between a first position in a vertical upright orientation and a second position in a vertical downward orientation, with a range of motion of approximately 180° between the first and second positions.

The locking hinge may be an automated lock, which may include though is not limited to a gravity lock or a spring lock. The automated lock comprises a lever and a stop surface, the lever being mounted for pivoting between a locked position in which the lever abuts the stop surface and an unlocked position in which the lever is displaced from abutting the stop surface. The automated lock is configured such that, when the upper body component is in the first position, the lever rests in the locked position abutting the stop surface and the lever is selectively manually manipulable for displacement to the unlocked position.

In the automated lock, the lever is pivotally mounted on a lever axis secured within the upper body component, and the stop surface is formed in the lower body component such that, when the upper body component is rotated from the first position, the lever travels with the upper body component to move away from the stop surface; and, when the upper body component is returned to the first position, the lever returns to the locked position abutting the stop surface.

The upper body component is configured such that: when in the first position, an outward facing surface of the upper body component is positioned at an inset location from an outward facing surface of the lower body component; and, when in the second position, an inward facing surface of the upper body component is positioned further outward of an outward facing surface of the lower body component.

The upper body component is mounted to the rotation axis by an elongated arm, the elongated arm being dimensioned such that the upper body component is rotatable between a first position where the upper body component is inset from the lower body component to a second position where the upper body component is positioned forward of the lower body component.

The lower body component comprises a forward edge configured to abut a top surface of a side rail of a flatbed platform, the forward edge being further configured such that an outer surface thereof resides at a location substantially parallel with an outer surface of the side rail, and the elongated arm of the upper body component is dimensioned to enable rotation of the upper body component between the first position and the second position with clearance of both the lower body component and a side rail of a stake pocket in which the lower body component is inserted.

The hinge is configured to enable rotation of the upper body component relative to the lower body component between a first position in a vertical upright orientation and a second position in a vertical downward orientation, and the elongated arm is dimensioned such that the upper body component, when in the vertical upright orientation and joined to a load platform, rests in a position to overhang an upper surface of the load platform.

The stake post may include an anchoring mechanism for securing the lower body component in a stake pocket of a flatbed platform. The anchoring mechanism comprises an anchoring plate positioned at a lower end of the lower body component, outside a stake pocket, and one or more anchoring assemblies for generating a compressive force between the anchoring plate and an upper region of the lower body component, the compressive force acting to vertically secure the lower body component in a stake pocket. The one or more anchoring assemblies may be one or more nut-and-bolt assemblies. The stake post may optionally include one or more throughholes provided in the lower body component for reception of one or more bolt assemblies for joining the stake post to an outer surface of a load platform.

The stake post may be installed on a flatbed platform by inserting the lower body component of the stake post into a stake pocket of the flatbed platform. Two or more stake posts may be used to construct a gate unit, with one or more barrier elements made to extend between the two or more stake posts. A plurality of gate units formed form the stake post may be joined with one another for construction of a load retention system. Alternatively, a plurality of stake posts may be positioned around the periphery of a load platform as a load retention system, without inclusion of barrier elements extending between the individual stake posts.

In use, a plurality of stake posts may be employed for transporting cargo on a flatbed platform by loading cargo onto the flatbed platform while the plurality of stake posts are inserted in stake pockets along a periphery of the flatbed platform, wherein during said loading the upper component of at least one of the plurality of stake posts is placed in the second position. The cargo may then be transported on the flatbed platform, wherein during said transporting the upper body components of the plurality stake posts remain locked in the first position. The cargo may then be unloaded from the flatbed platform while the plurality of stake posts are inserted in stake pockets along the periphery of the flatbed platform, wherein during said unloading the upper component of at least one of the plurality of stake posts is placed in the second position.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIGS. 4a-4b show a stake post according to the present invention, in which.

FIGS. 5a-5b show alternate views of the stake post in FIGS. 4a-4b, in which: FIG. 5a shows the stake post as seen along line Va-Va in FIG. 4a; and FIG. 5b shows the stake post as seen along line Vb-Vb in FIG. 5a;

FIGS. 6a-6b provide further illustrations of a stake post according to the present invention, in which.

FIGS. 8a-8b show close-up view of the stake post in FIG. 4a, in which: FIGS. 9a-9b show alternate views of the stake post in FIGS. 4a-4b, in which: FIG. 9a shows the stake post as seen along line IXa-IXa in FIG. 4a; and FIG. 9b shows the stake post as seen along line IXb-IXb in FIG. 9a.

DETAILED DESCRIPTION OF THE INVENTION

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless otherwise made clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

The present invention is inclusive of a stake post having a locking hinge that enables selective movement of a gate unit between a first position in which the gate unit forms a portion of a retaining wall in cooperation with other gate units, and a second position in which the gate unit is removed from alignment with one or more adjacent gate units to thereby provide an opening through a retaining wall. Preferably, stake posts according to the present invention are further configured to provide a rotation hinge that is dimensioned such that, when the gate unit is mounted to a flatbed platform, the rotation hinge remains positioned within a predefined perimeter of the load platform so as to not increase a predefined width of the load platform, thereby ensuring continued compliance with vehicle width regulations. It is also preferable that stake posts according to the present invention be configured such that an upper body element of the stake posts is adapted for rotation through a range of 180° between a vertical upright orientation and a vertical downward orientation, while providing adequate clearance for a side rail of a load platform. The present invention is further inclusive of gate units, load retaining systems, and vehicles utilizing such stake posts.

Figures 4A, 4B:
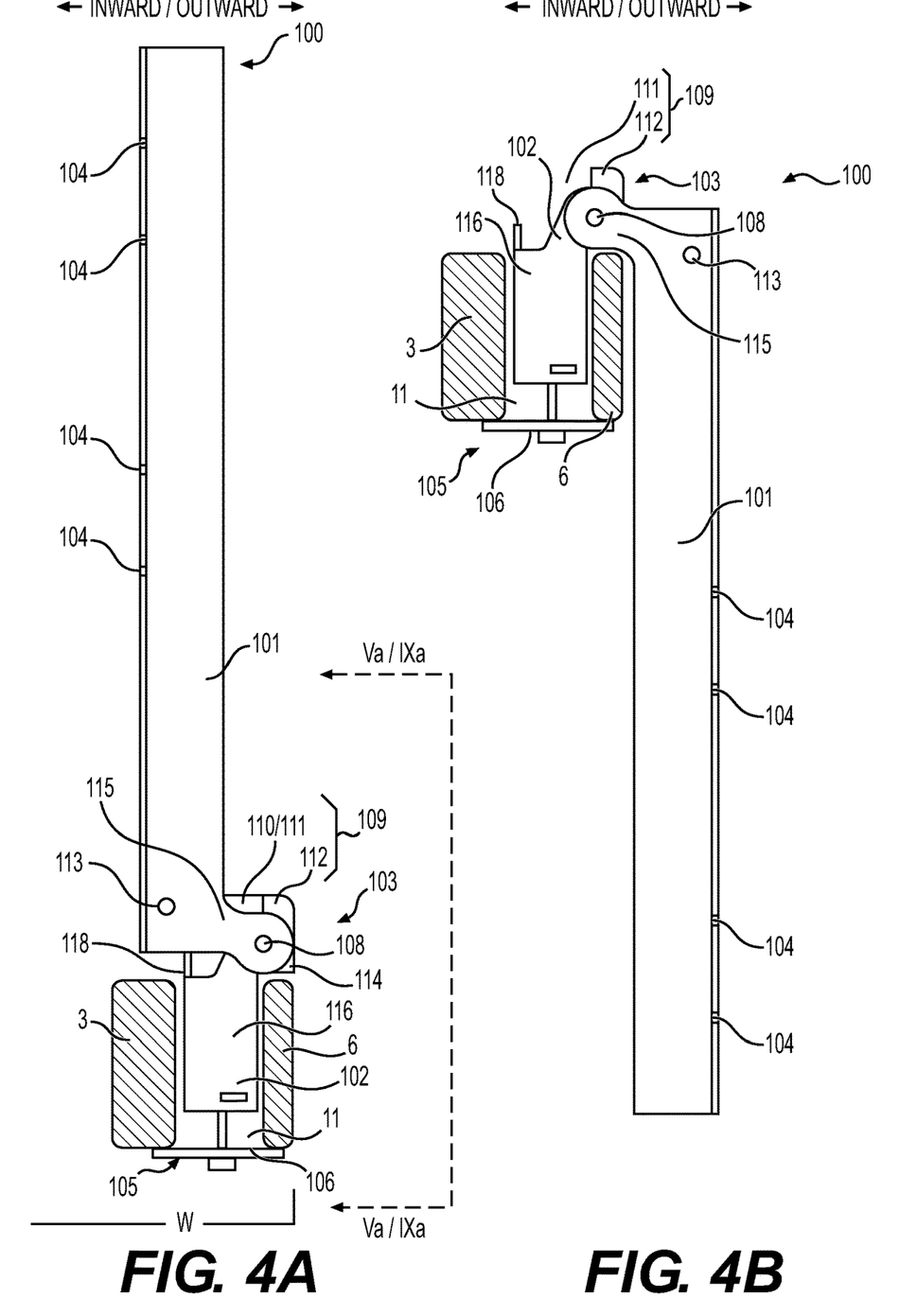
FIG. 4a shows an upper body component of the stake post in a vertical upright orientation.
FIG. 4b shows the upper body component of the stake post rotated to a vertical downward orientation.

FIGS. 4a and 4b show a side view of a stake post 100 according to the present invention, as received in a stake pocket 11 located between an outer surface of a load platform 3 and an inner surface of a side rail 6. The stake post 100 in this example is inclusive of an upper body component 101, a lower body component 102, and a locking hinge 103.

FIG. 4a shows the stake post 100 in an upright orientation, with the upper body component 101 aligned in vertically upright orientation relative to the lower body component 102, such as when the stake post 100 is used in a gate unit 7 that is positioned to form a portion of a retaining wall 8. FIG. 1A shows an example of a retaining wall 8 formed from a plurality of gate units 7 positioned in such a vertically upright orientation. FIG. 4b shows the stake post 100 in a vertically downward orientation, with the upper body component 101 rotated 180° to a vertically downward orientation relative to the lower body component 102, such as when used in a gate unit 7 that is rotated away from adjacent gate units 7 so as to form an opening in a retaining wall 8. FIG. 1B shows an example of an opening formed in a retaining wall 8 when a number of gate units 7 are positioned in such a vertically downward orientation. While FIG. 1B shows all gate units 7 on a side of the load platform in the in the vertically downward orientation, it will be understood that each gate unit 7 is individually moveable between the vertically upward downward orientations. In addition to creating an opening in the retaining wall 8, a gate unit 7 positioned in the vertically downward orientation may also be used as a stepping ladder, with a user stepping on the individual slats 9 (FIG. 3) of a gate unit 7 to climb onto the load platform 3.

As seen in FIG. 4a, when in the vertically upward orientation, the upper body component 101 is brought to rest against a rotational stop 118 formed on and extending vertically upward from the lower body component 102. The rotational stop 118 serves to define a maximum degree of rotational freedom for the upper body component 101, when rotating from the vertically downward orientation (FIG. 4b) to the vertically upward orientation, and prevents the upper body component 101 from rotating to such a degree that it would collide with the load platform 3. In some examples, such as that illustrated in FIG. 4a, the rotational stop 118 may be dimensioned and positioned so as to define a terminal rotational position whereby the upper body component 101 is brought to rest vertically above and spatially separated from an upper surface of the load platform 3 so as to overhang an upper surface of the load platform 3. As seen in FIG. 4b, when in the vertically downward orientation, the upper body component 101 is positioned to extend in parallel with the lower body component 102.

Preferably, the upper body component 101 is adapted for mounting of one or more barrier elements, and in use two or more stake posts 100 will be mounted with one or more common barrier elements to form a gate unit 7. Examples of barrier elements that may be used with stake posts 100 according to the present invention include, though are not limited to: a plurality of slats; an individual plate or sheet of solid or perforated material; chain link fencing; meshing screening; etc. Barrier elements used with the stake post 100 may span only a portion of the upper body component 101 height, or may span the entirety of the upper body component 101 height. In the illustrated example, the upper body component 101 is provided with a number of through-holes 104 for reception of fastening mechanisms (e.g., nut-and-bolt assemblies) that may be used for securing one or more barrier elements thereto. In other examples, the upper body component 101 may be provided with any other suitable fastening mechanism(s) for fastening an intended barrier element thereto. Alternatively, in some examples, stake posts 100 according to the present invention may be used as standalone barriers posts without inclusion of any further barrier elements between the separate stake posts. Use of the stake posts without barrier elements may be suitable when transporting especially lengthy cargo, such as freshly cut timber logs, or large machinery.

The lower body component 102 is shaped and dimensioned for insertion into a stake pocket 11, the stake pocket 11 being positioned between an outer surface of the load platform 3 and an inner surface of a side rail 6. Preferably, the lower body component 102 is provided with an anchoring mechanism 105 for further securing the lower body component 102 in a stake pocket 11. In the illustrated example, as seen in FIGS. 4a-5b, the lower body component 102 is provided with an anchoring mechanism 105 in the form of an anchoring plate 106 that cooperates with a base plate 107 of the lower body component 102.

Figure 5A:
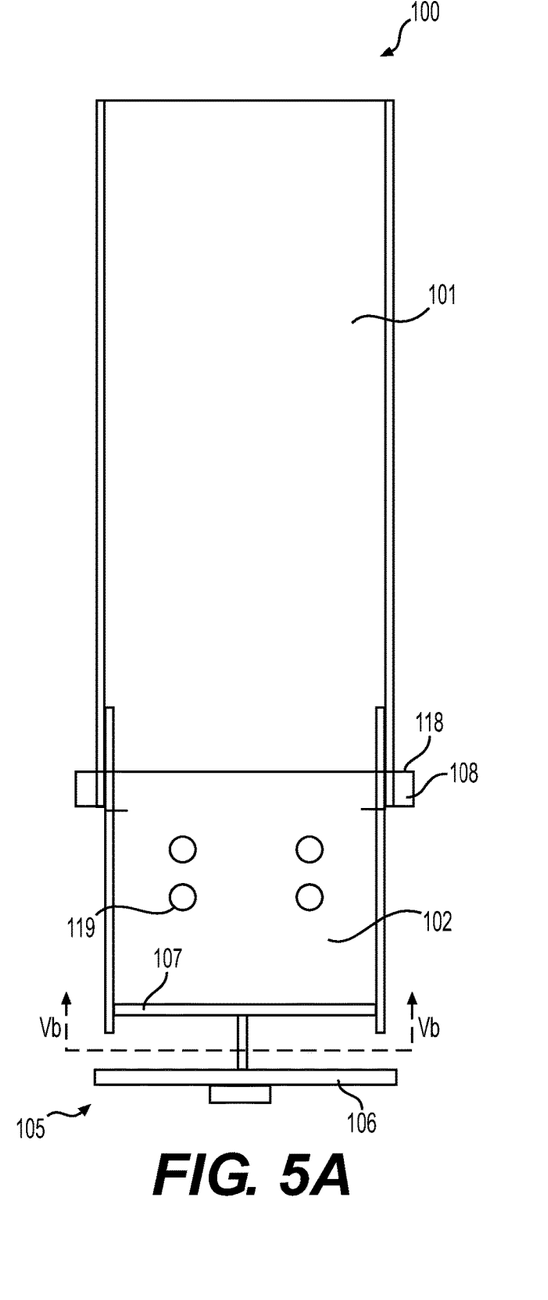
Figure 5B:
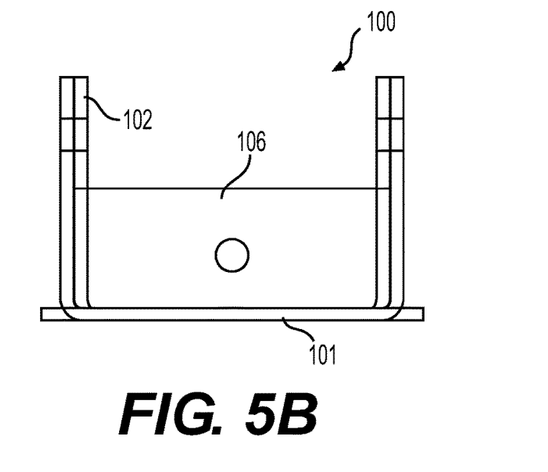

FIG. 5a shows a front elevation view of the stake post 100, as seen along line Va-Va in FIG. 4a, and FIG. 5b shows a bottom plan view of the stake post 100, as seen along line Vb-Vb in FIG. 5a. FIGS. 5a-5b omit the load platform 3 and side rail 6. The base plate 107 is positioned internally of the lower body component 102 and the anchoring plate 106 is positioned externally of the lower body component 102 and outside the stake pocket 11. The base plate 107 and the anchor plate 106 are provided with corresponding throughholes for reception of a nut-and-bolt assembly. In this arrangement, the anchoring plate 106 is sized and dimensioned to exceed the dimensions of the stake pocket 11 such that, upon inserting and tightening the nut-and-bolt assembly, the base plate 106 and anchoring plate 107 are drawn toward one another until the anchoring plate 106 is brought to press against bottom face surfaces of the load platform 3 and the side rail 6, or against a bottom face surface of the stake pocket 11 itself.

As seen in FIG. 5a, the lower body component 102 may optionally include one or more throughholes 119 that each provide a through-passage between outward and inward facing surfaces of the lower body component 102. Throughholes 119 may be included as a means for using the stake post 100 with load platforms 3 that lack a stake pocket 11, for example, by enabling attachment of the lower body component 102 to an outer surface of a load platform 3 via one or more bolt assemblies (e.g., threaded bolts) that are inserted to extend through the throughholes 119 and into a surface of the load platform 3.

Figure 9A:
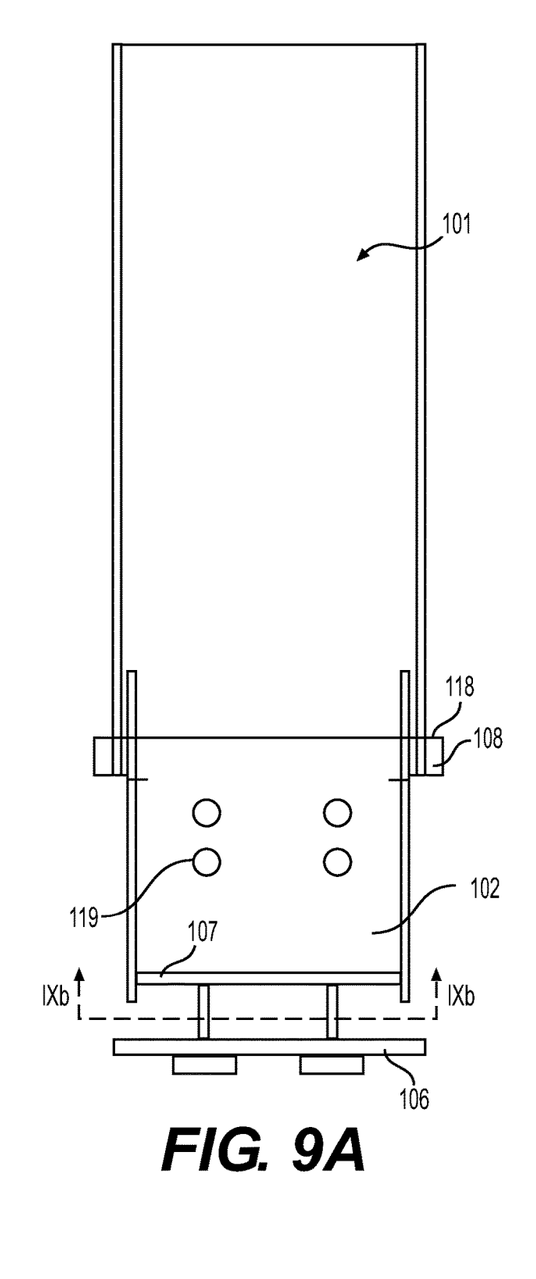
Figure 9B:
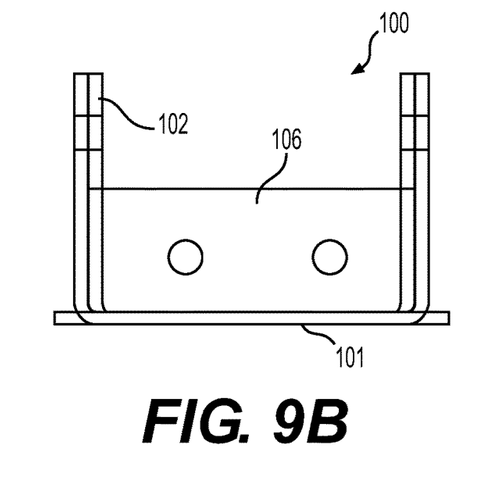

FIGS. 9a-9b illustrate another example in which the anchoring mechanism 105 is provided in the form of an anchoring plate 106 having two separate nut-and-bolt assemblies that cooperate with separate through-holes in the anchoring plate 106 and the base plate 107. FIG. 9a shows a front elevation view of the stake post 100, as seen along line IXa-IXa in FIG. 4a, and FIG. 9b shows a bottom plan view of the stake post 100, as seen along line IXb-IXb in FIG. 9a. In this example, the through-holes of the separate nut-and-bolt assemblies are positioned equidistantly from a central axis of the anchoring plate 106 and the base plate 107 so as to promote a balanced tightening of the anchoring mechanism 105 with an even distribution of vertical compressive forces that secure the lower body component 102 vertically against the side rail 6.

The locking hinge 103 joins the upper body component 101 with the lower body component 102, and is inclusive of a locking mechanism 109. A rotation axis 108 enables rotation of the upper body component 101 relative to the lower body component 102 through a range of 180° between an upright vertical orientation (FIG. 4a) and a downward vertical orientation (FIG. 4b). The locking mechanism 109 is operable to selectively lock and release the rotation axis 108.

In the illustrated example, the locking mechanism 109 is provided as a gravity lock comprising a manually manipulable lever 110, a lever reception gap 111, and a lever stop 112. The lever 110 is pivotally mounted on a lever axis 113 and rests, under the force of gravity, in the lever reception gap 111 and in abutment with the lever stop 112. The lever axis 113 is provided internally within the upper body component 101, such that the lever 110 is mounted within the upper body component 101. The lever reception gap 111 and lever stop 112 are provided at the lower body component 102. With the lever 110 mounted on the lever axis 113, within the upper body component 101, rotation of the upper body component 101 relative to the lower body component 102 requires that the lever 110 likewise travel with the upper body component 101 in rotation about the rotation axis 108. However, while resting in the lever reception gap 111, the lever 110 is in abutment with the lever stop 112 provided at the lower body component 102, and is thereby prevented from rotating about the rotation axis 108. Thus, while the lever 110 remains at rest in the lever reception gap 111, the upper body component 101 is locked from rotating about the rotation axis 108.

A user may manually pivot the lever 110 about the lever axis 113 to remove the lever 110 from the lever reception gap 111, thereby displacing the lever 110 from abutting the lever stop 112. With the lever 110 thus displaced, a user may freely rotate the upper body component 101 about the rotation axis 108, with the lever 110 passing over the lever stop 112 to travel with the upper body component 101, enabling the upper body component 101 to rotate 180° from the vertically upright orientation (FIG. 4a) to the vertically downward orientation (FIG. 4b). If the upper body component 101 is rotated back to the vertical upright orientation (FIG. 4a), the lever 110 will drop, under the force of gravity, back into the lever reception gap 111 to once again rest in abutment with the lever stop 112, thereby locking the rotation axis 108 against rotation of the upper body component 101 until the lever 110 is again displaced from the reception gap 111.

In other examples, the locking mechanism 109 may be provided with any other suitable construction, though it is preferable that the locking mechanism be of a construction that promotes a self-locking action upon the upper body component 101 being rotated to the vertical upright orientation (FIG. 4a). An example of an alternative construction is a spring-lock in which the manually manipulable lever 110 is urged toward the lever reception gap 111 under a biasing force of a spring. A spring-lock construction would operate in substantially the same manner as the gravity lock construction. Generally, the manipulable lever 110 will rest in the lever reception gap 111 while the upper body component 101 is in the vertical upright orientation (FIG. 4a), and a user may manually pivot the lever 110 about the lever axis 113, against the biasing force of the spring, to remove the lever 110 from the lever reception gap 111 and permit displacement of the lever 110 from abutting the lever stop 112. With the pivot the lever 110 so displaced, the user may then rotate the upper body component 101 from the vertically upright orientation (FIG. 4a) to the vertically downward orientation (FIG. 4b). Upon return of the upper body component 101 to the vertical upright orientation (FIG. 4a), the lever 110 will automatically return to the lever reception gap 111 under the biasing force of the spring, once again resting in abutment with the lever stop 112 and locking the upper body component 101 against rotation until the lever 110 is again displaced from the reception gap 111.

In some examples, the stake post 100 may omit a locking hinge 103, and may instead adopt a freely rotating hinge construction that lacks a locking mechanism 109. With such a construction, the upper body component 101 will be freely rotatable about the rotation axis 108 relative to the lower body component 102. In such examples, other means may be used for securing and releasing the upper body component 101 at the vertical upright orientation. For example, when the stake post 100 is incorporated into a gate unit 7 (FIG. 3), one or more locking device may be provided to one or more slats 9 on the gate unit 7, with the locking devices adapted to engage corresponding mating locking devices on adjacent gate units 7 and/or on a surface of the platform bed for securing the gate unit 7 in a vertical upright orientation.

It is preferable, as shown in the illustrated example, that the lower body component 102 have a forward ledge 114 that rests atop the side rail 6, and that the rotation axis 108 be inset from the forward ledge 114, with the upper body component 101 mounted to the rotation axis 108 via an elongated arm 115. By positioning the rotation axis 108 at an inset location, the stake post 100 is thus configured such that, upon inserting the stake post 100 into a stake pocket 11, and while the upper body component 101 remains locked in the vertically upright orientation (FIG. 4a), there is not any part of the stake post 100 that extends beyond a maximum width W that is predefined by the side rails 6 of the load platform 3 (see FIG. 2). This is significant, as federal regulations place limitations on the maximum width permitted for a vehicle to travel on the Interstate highway system (e.g., presently, up to 102 in. or 2.5908 m). It is custom for load transporting vehicles to be made with the maximum permissible size, so as to best maximize load carrying capacity. As such, for vehicles with load platforms, having side rails with stake pockets for the reception of gate units, it is common for the load platform to be made with such a width that the outer surfaces of the side rails reside at the maximum width permitted under Federal Regulation. By positioning the rotation axis 108 at an inset location, stake posts 100 according to the present invention may be freely used with pre-made load platforms 3 that are constructed at the maximum permissible width W without increasing the overall width of the load platform 3, thereby ensuring continued compliance with federal regulations.

With the rotation axis 108 positioned at an inset location, it is preferable that the upper body component 101 be joined to the rotation axis 108 via an elongated arm 115, so as to ensure that the upper body component 100 can freely rotate about the rotation axis 108 without impacting either the forward edge 114 of the lower body component 102 or the side rail 6. As seen in FIG. 4b, with use of an elongated arm 115 of adequate length, the upper body component 101 is capable of rotating to a vertically downward orientation without interference from the side rail 6, thereby enabling a full 180° range of rotation from the vertically upright orientation (FIG. 4a). This is significant as it enables positioning of a gate unit 7 formed with the stake post 100 to be stored in a convenient, space saving position when displaced from a retaining wall 8, while enabling a user to access an opening created in the retaining wall 8, resulting from the displacement of the gate unit 7, without interference from the gate unit 7 and without potential damage to the gate unit 7.

Figure 6A:
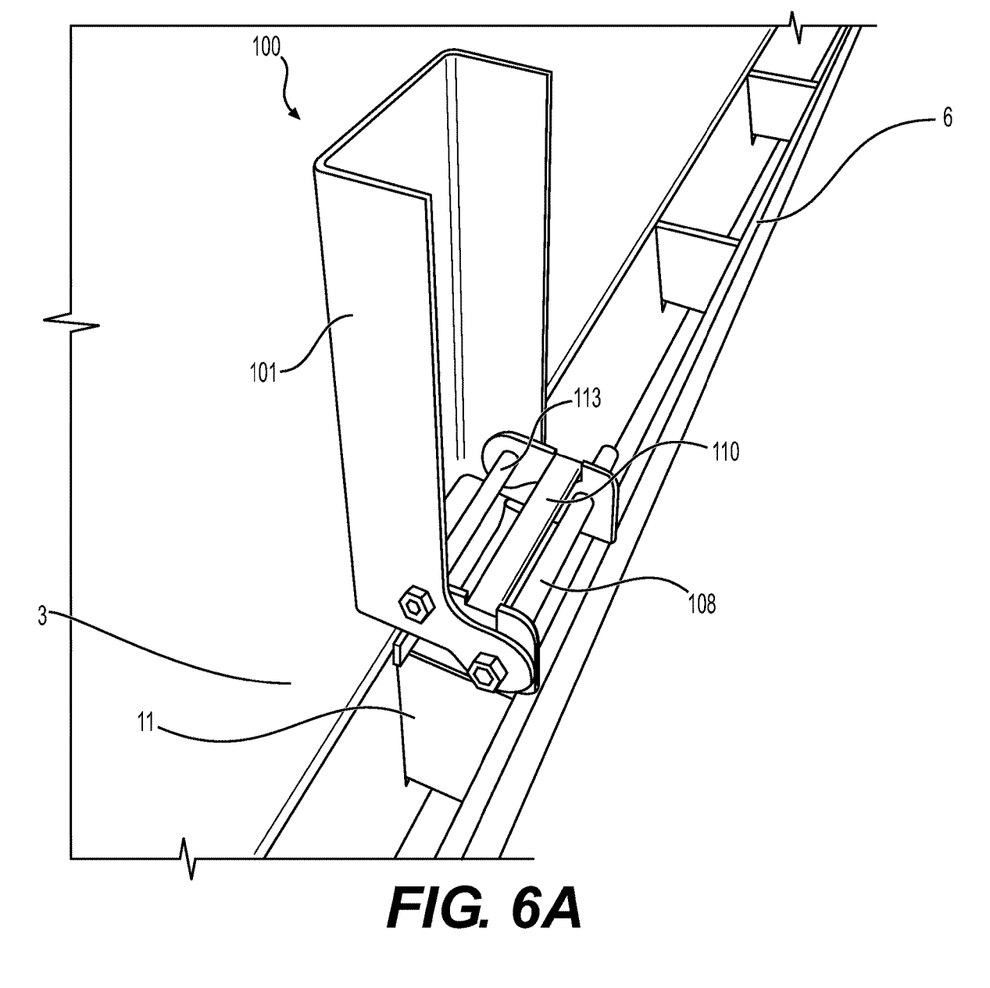
FIG. 6a shows an upper body component of the stake post in a vertical upright orientation.
Figure 6B:
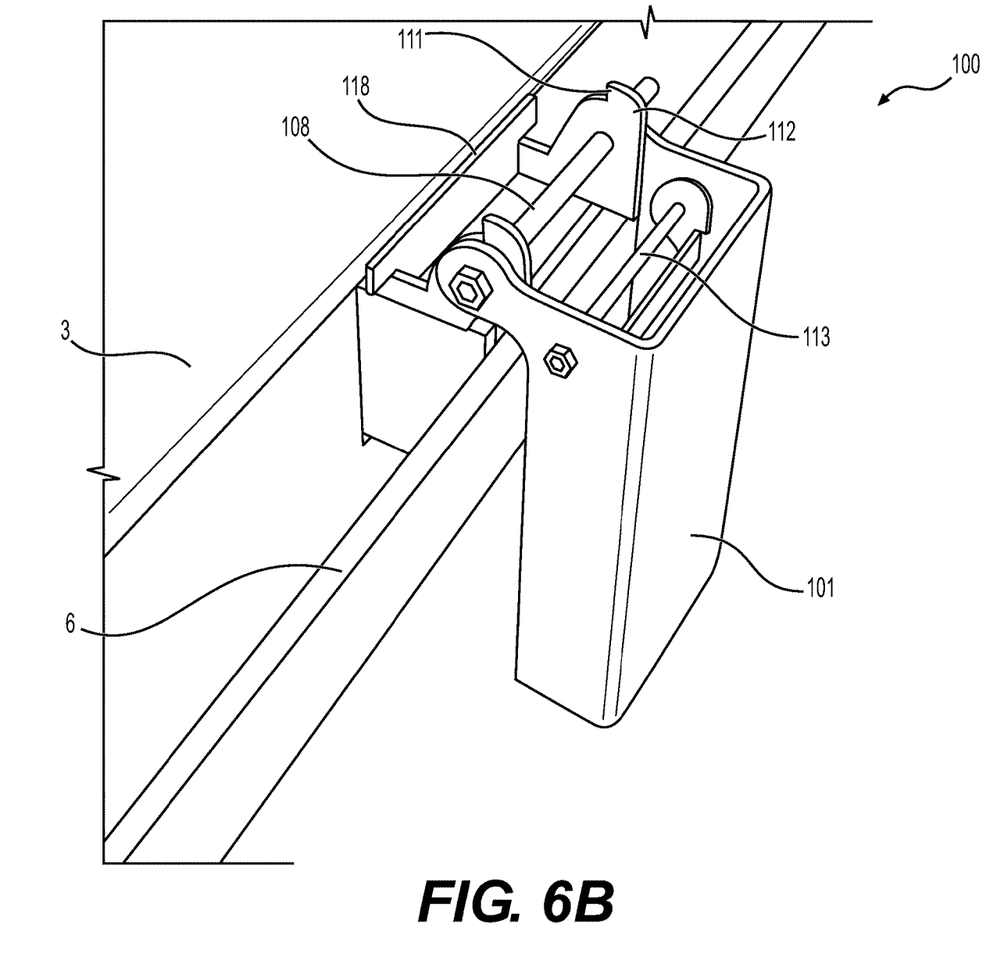
FIG. 6b shows the upper body component of the stake post rotated to a vertical downward orientation.
Figure 7:
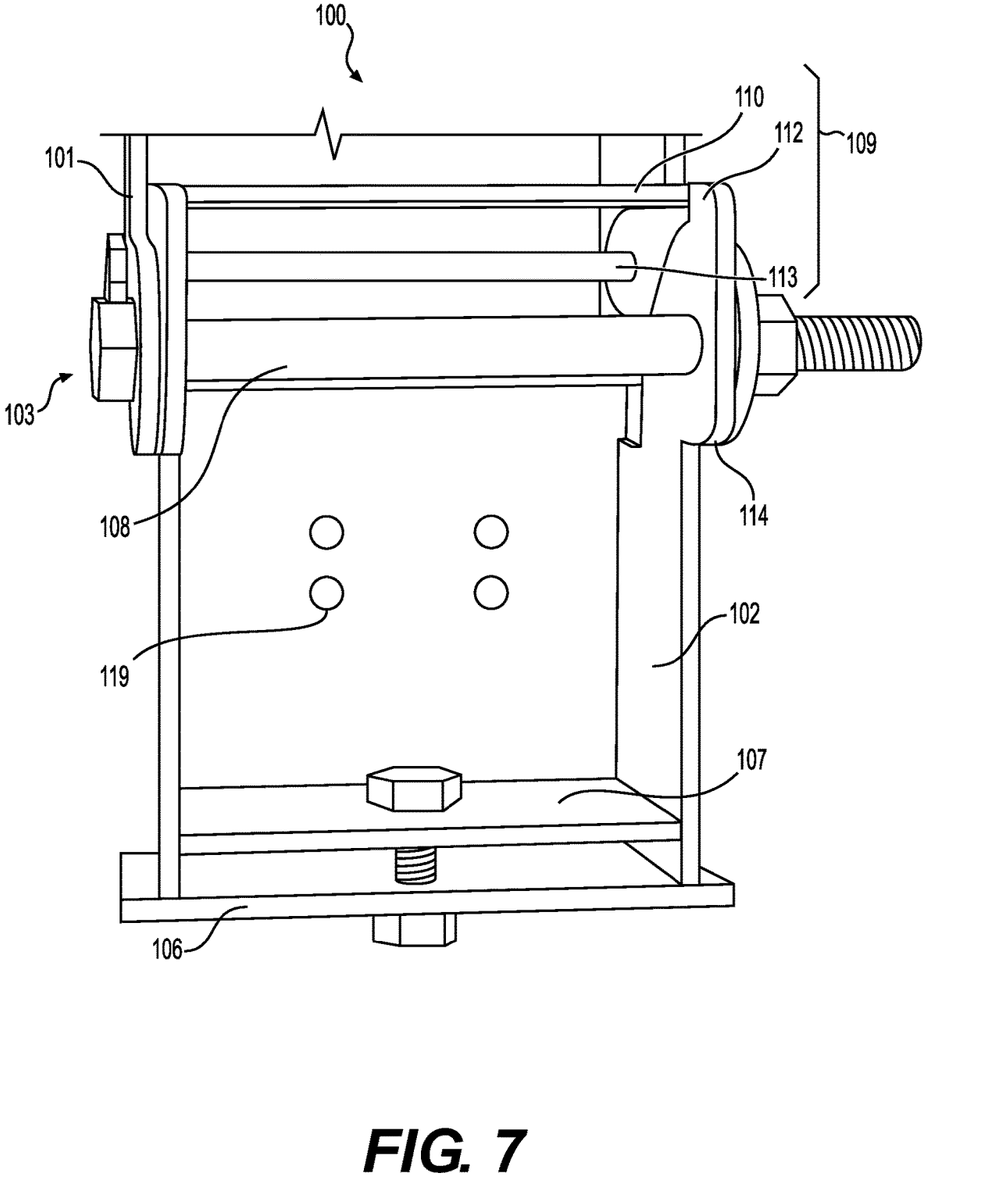
FIG. 7 shows a close up view of the stake post shown in FIGS. 6a-6b, with a close-up of the lower body component and a locking hinge.

FIGS. 6-7 provide further illustrations of a stake post 100 according to the present invention. FIG. 6a shows the stake post 100 attached to a load platform 3, via insertion of the lower body component 102 in a stake pocket 11, with the stake post 100 in a vertically upright orientation, and FIG. 6b shows the same stake post 100 following rotation to a vertically downward orientation. FIG. 7 shows the stake post 100, as removed from the stake pocket 11, with a close-up of the lower body component 102, the hinged axis 103, and the locking mechanism 109.

Figure 8A:
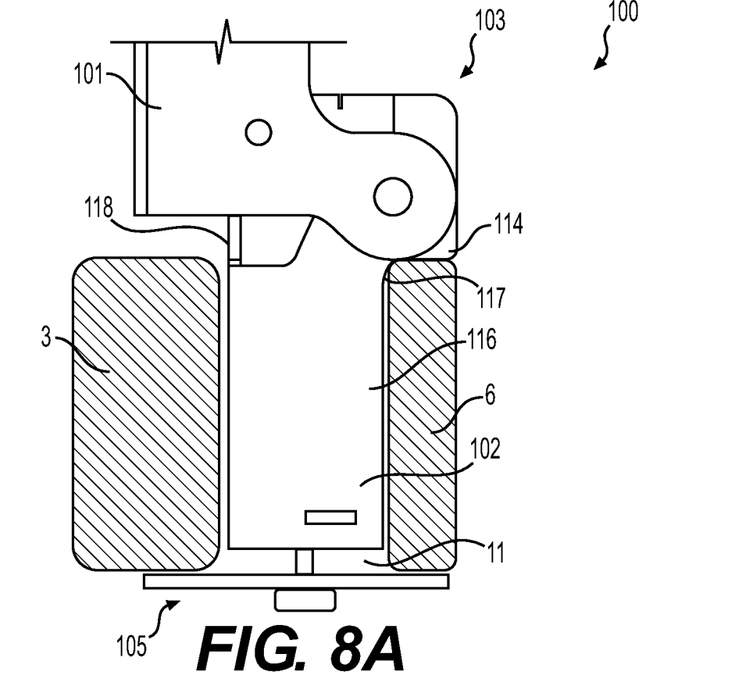
FIG. 8a shows the stake post with a first example of a transition region.
Figure 8B:
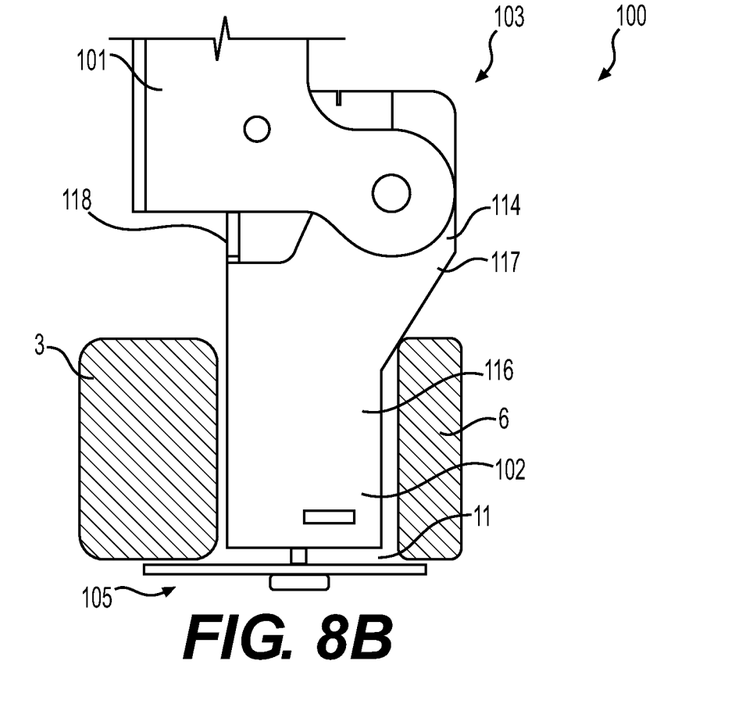
FIG. 8b shows the stake post with a second example of a transition region.

FIGS. 8a-8b show a close-up view of the lower body component 102 of the stake post 100. As seen in these illustrated examples, the lower body component 102 may optionally include a transition region 117 extending between a lower region 116 and the forward edge 114 of the lower body component 102. A transition region 117 provides a gradual change in width of the lower body component 102, between an outer surface of the lower region 116 and an outer surface of the forward edge 114. In FIG. 8a, a transition region 117 is provided in the form of a curved surface presenting a curved arc between the lower region 116 and the forward edge 114. In FIG. 8b, a transition region 117 is provided in the form of a tapered surface presenting a constant slope between the lower region 116 and the forward edge 114.

With inclusion of a transition region 117, the lower body component 102 is adapted for use with stake pockets of varying dimensions. When inserted in a stake pocket 11 an anchoring mechanism 105 will help to create a vertical compressive force, between the anchoring mechanism 105 and a lower surface of the forward edge 114, to vertically secure the lower body component 102 against an upper surface of a side rail 6. However, depending on the dimensions of the stake pocket 11, there may remain free space within the stake pocket that could allow for horizontal shifting of the lower body component 102 within the stake pocket 11. By providing a transition region 117, the lower body component 102 is provided with a region of gradually changing width that enables a better fitted insertion of the lower body component 102 within stake pockets 11 of varying dimensions. With inclusion of a transition region 117, upon tightening an anchoring mechanism 105, the lower body component 102 will be drawn into the stake pocket 11 with the upper surface of the side rail 6 riding along the gradually enlarging transition region 117 and forcing the lower body component 102 into a fitted reception that will reduce and preferably preclude a horizontal shifting of the lower body component 102 within the stake pocket 11.

Stake posts according to the present invention, with inclusion of a locking hinge that is capable of a 180° rotation between upright and downward orientations, enable the construction of gate units that may be used to form a retaining wall around a load platform and which a user may easily displace from the retaining wall, to form an opening therethrough, without requiring lifting, removal and separate storage of the gate units. Instead, a user may form an opening in a retaining wall by simply rotating one or more gate units 180° from an upright orientation to a downward orientation. Gate units in an upward orientation will remain in position to from portions of the retaining wall, and secure a load on the load platform, while gate units rotated to a downward orientation will be displaced from the retaining wall to provide an opening for access and removal of a load from the load platform. Gate units rotated to a downward orientation remain joined to the load platform, through stowed in a convenient space saving position that avoids any interference with a user's access to a load on the load platform.

The foregoing disclosures addresses an example of a stake post that is separate from a load platform, and which is configured for selective connection to and removal from a load platform via engagement of a lower body component of the stake post with a stake pocket on the load platform. It will be understood that the present invention also encompasses stake posts that are integral with the load platform, such as examples in which the lower body component is provided as a component of the load platform itself. Likewise, it will be understood that the present invention also encompasses gate units and other load retaining systems that comprise stake posts according to the present invention.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass any combination of the disclosed embodiments, in whole or in part, as well as additional embodiments embracing various changes and modifications relative to the examples disclosed herein without departing from the scope of the invention as defined in the appended claims and equivalents thereto.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein.

The present invention is not limited to the exemplary embodiments illustrated herein, but is instead characterized by the appended claims, which in no way limit the scope of the disclosure.

What is claimed is:

1. A stake post, for use in securing a load on a flatbed platform, comprising
    a lower body component adapted for selective insertion into and removal from a stake pocket on a flatbed platform;
    an upper body component joined and rotatable relative to the lower body component; and
    a locking hinge configured to enable rotation of the upper body component about a rotation axis and relative to the lower body component, the upper body component being rotatable between a first position and a second position,
    wherein the locking hinge is adapted for locking the upper body component in the first position and selectively releasing the upper body component for rotation to the second position, and the rotation axis is secured within an upper region of the lower body component, at a location inset from a forward edge of the lower body component, such that the rotation axis does not define an outer perimeter of the lower body component.

2. The stake post according to claim 1, wherein
    the locking hinge is configured to enable rotation of the upper body component relative to the lower body component between a first position in a vertical upright orientation and a second position in a vertical downward orientation, with a range of motion of approximately 180° between the first and second positions.

3. The stake post according to claim 1, wherein
    the upper body component is configured such that:
        when in the first position, an outward facing surface of the upper body component is positioned at an inset location from an outward facing surface of the lower body component, and
        when in the second position, an inward facing surface of the upper body component is positioned further outward of an outward facing surface of the lower body component.

4. A stake post, for use in securing a load on a flatbed platform, comprising
    a lower body component adapted for selective insertion into and removal from a stake pocket on a flatbed platform;
    an upper body component joined and rotatable relative to the lower body component; and
    a hinge configured to enable rotation of the upper body component about a rotation axis and relative to the lower body component, the upper body component being rotatable between a first position and a second position, wherein
    the lower body component comprises a forward edge configured to abut a top surface of a side rail of a flatbed platform, the forward edge being further configured such that an outer surface thereof resides at a location substantially parallel with or inset from an outer surface of the side rail, and the rotation axis is positioned within the lower body component, at a location inset from the forward edge of the lower body component, such that the rotation axis does not define an outer perimeter of the lower body component, and
    the upper body component is mounted to the rotation axis by an elongated arm, the elongated arm dimensioned such that the upper body component is rotatable between a first position where the upper body component is inset from the lower body component to a second position where the upper body component is positioned forward of the lower body component.

5. A stake post, for use in securing a load on a flatbed platform, comprising
    a lower body component adapted for selective insertion into and removal from a stake pocket on a flatbed platform;
    an upper body component joined and rotatable relative to the lower body component; and
    a hinge configured to enable rotation of the upper body component about a rotation axis and relative to the lower body component, the upper body component being rotatable between a first position and a second position, wherein
    the upper body component is mounted to the rotation axis by an elongated arm, the elongated arm dimensioned such that the upper body component is rotatable between a first position where the upper body component is inset from the lower body component to a second position where the upper body component is positioned forward of the lower body component,
    the lower body component comprises a forward edge configured to abut a top surface of a side rail of a flatbed platform, the forward edge being further configured such that an outer surface thereof resides at a location substantially parallel with or inset from an outer surface of the side rail, and
    the elongated arm of the upper body component is dimensioned to enable rotation of the upper body component between the first position and the second position with clearance of both the lower body component and a side rail of a stake pocket in which the lower body component is inserted.

6. The stake post according to claim 4, wherein
    the locking hinge is configured to enable rotation of the upper body component relative to the lower body component between a first position in a vertical upright orientation and a second position in a vertical downward orientation, and
    the elongated arm is dimensioned such that the upper body component, when in the vertical upright orientation and joined to a load platform, rests in a position to overhang an upper surface of the load platform.

7. The stake post according to claim 1, wherein
    the locking hinge comprises an automated lock.

8. The stake post according to claim 7, wherein
    the automated lock comprises a lever and a stop surface, the lever being mounted for pivoting between a locked position in which the lever abuts the stop surface and an unlocked position in which the lever is displaced from abutting the stop surface, and the automated lock is configured such that, when the upper body component is in the first position, the lever rests in the locked position abutting the stop surface and the lever is selectively manually manipulable for displacement to the unlocked position.

9. The stake post according to claim 8, wherein
the lever is pivotally mounted on a lever axis secured within the upper body component, and the stop surface is formed in the lower body component such that
when the upper body component is rotated from the first position, the lever travels with the upper body component to move away from the stop surface, and
when the upper body component is returned to the first position, the lever returns to the locked position abutting the stop surface.

10. The stake post according to claim 7, wherein
the automated lock is a gravity lock or a spring lock.

11. The stake post according to claim 1, further comprising:
an anchoring mechanism for securing the lower body component in a stake pocket of a flatbed platform.

12. A stake post, for use in securing a load on a flatbed platform, comprising
a lower body component adapted for selective insertion into and removal from a stake pocket on a flatbed platform;
an upper body component joined and rotatable relative to the lower body component;
a locking hinge configured to enable rotation of the upper body component about a rotation axis and relative to the lower body component, the upper body component being rotatable between a first position and a second position, wherein the locking hinge is adapted for locking the upper body component in the first position and selectively releasing the upper body component for rotation to the second position; and
an anchoring mechanism for securing the lower body component in a stake pocket of a flatbed platform, the anchoring mechanism comprising an anchoring plate positioned at a lower end of the lower body component, for placement outside a stake pocket, and one or more anchoring assemblies for generating a compressive force between the anchoring plate and an upper region of the lower body component, the compressive force acting to vertically secure the lower body component in a stake pocket.

13. The stake post according to claim 12, wherein
the one or more anchoring assemblies are one or more nut-and-bolt assemblies.

14. The stake post according to claim 1, wherein
the lower body component comprises one or more throughholes for reception of one or more bolt assemblies for joining the stake post to an outer surface of a load platform.

15. A method of using a stake post, comprising:
installing a stake post according to claim 1 on a flatbed platform by inserting the lower body component of the stake post into a stake pocket of the flatbed platform.

16. A gate unit comprising:
two or more stake posts according to claim 1, with one or more barrier elements extending between the two or more stake posts.

17. A load retention system, comprising:
a plurality of gate units according to claim 16.

18. A load retention system, comprising:
a plurality of stake posts according to claim 1.

19. A method of transporting cargo, utilizing a flatbed platform and a plurality of stake posts according to claim 1, comprising:
loading cargo onto the flatbed platform while the plurality of stake posts are inserted in stake pockets along a periphery of the flatbed platform, wherein during said loading the upper component of at least one of the plurality of stake posts is placed in the second position;
transporting cargo on the flatbed platform, wherein during said transporting the upper body components of the plurality stake posts remain locked in the first position; and
unloading cargo from the flatbed platform while the plurality of stake posts are inserted in stake pockets along the periphery of the flatbed platform, wherein during said unloading the upper component of at least one of the plurality of stake posts is placed in the second position.

20. The method of claim 19, wherein
one or more barrier elements extend across one or more individual stake posts in the plurality of stake posts, such that each stake post having one or more barrier elements extending therebetween thereacross forms at least a part of a gate unit;
when placed in the second position, a gate unit formed from one or more individual stake posts and one or more barrier elements extending thereacross is placed in a vertically downward orientation extending downward from the flatbed platform; and
loading cargo onto the flatbed platform and/or unloading cargo from the flatbed platform further comprises a user climbing onto the flatbed platform by stepping on the one or more barrier elements in a gate unit that is placed in the second position.

21. The stake post according to claim 4, wherein
the rotation axis is secured in an upper region of the lower body component.

22. The stake post according to claim 4, wherein
the locking hinge is configured to enable rotation of the upper body component relative to the lower body component between a first position in a vertical upright orientation and a second position in a vertical downward orientation, with a range of motion of approximately 180° between the first and second positions.

23. The stake post according to claim 4, further comprising:
an anchoring mechanism for securing the lower body component in a stake pocket of a flatbed platform.

24. The stake post according to claim 23, wherein
the anchoring mechanism comprises an anchoring plate positioned at a lower end of the lower body component, outside a stake pocket, and one or more anchoring assemblies for generating a compressive force between the anchoring plate and an upper region of the lower body component, the compressive force acting to vertically secure the lower body component in a stake pocket.

25. The stake post according to claim 24, wherein
the one or more anchoring assemblies are one or more nut-and-bolt assemblies.

26. The stake post according to claim 4, wherein
the lower body component comprises one or more throughholes for reception of one or more bolt assemblies for joining the stake post to an outer surface of a load platform.

27. A method of using a stake post, comprising:
installing a stake post according to claim 4 on a flatbed platform by inserting the lower body component of the stake post into a stake pocket of the flatbed platform.

28. A gate unit comprising:
two or more stake posts according to claim 4, with one or more barrier elements extending between the two or more stake posts.

29. A load retention system, comprising:
a plurality of gate units according to claim 28.

30. A load retention system, comprising:
a plurality of stake posts according to claim 4.

31. A method of transporting cargo, utilizing a flatbed platform and a plurality of stake posts according to claim 4, comprising:
loading cargo onto the flatbed platform while the plurality of stake posts are inserted in stake pockets along a periphery of the flatbed platform, wherein during said loading the upper component of at least one of the plurality of stake posts is placed in the second position;
transporting cargo on the flatbed platform, wherein during said transporting the upper body components of the plurality stake posts remain locked in the first position; and
unloading cargo from the flatbed platform while the plurality of stake posts are inserted in stake pockets along the periphery of the flatbed platform, wherein during said unloading the upper component of at least one of the plurality of stake posts is placed in the second position.

32. The method of claim 31, wherein
one or more barrier elements extend across one or more individual stake posts in the plurality of stake posts, such that each stake post having one or more barrier elements extending thereacross forms at least a part of a gate unit;
when placed in the second position, a gate unit formed from one or more individual stake posts and one or more barrier elements extending thereacross is placed in a vertically downward orientation extending downward from the flatbed platform; and
loading cargo onto the flatbed platform and/or unloading cargo from the flatbed platform further comprises a user climbing onto the flatbed platform by stepping on the one or more barrier elements in a gate unit that is placed in the second position.

33. The stake post according to claim 5, wherein
the locking hinge is configured to enable rotation of the upper body component relative to the lower body component between a first position in a vertical upright orientation and a second position in a vertical downward orientation, with a range of motion of approximately 180° between the first and second positions.

34. The stake post according to claim 5, wherein
the locking hinge is configured to enable rotation of the upper body component relative to the lower body component between a first position in a vertical upright orientation and a second position in a vertical downward orientation, and
the elongated arm is dimensioned such that the upper body component, when in the vertical upright orientation and joined to a load platform, rests in a position to overhang an upper surface of the load platform.

35. The stake post according to claim 5, further comprising:
an anchoring mechanism for securing the lower body component in a stake pocket of a flatbed platform.

36. The stake post according to claim 35, wherein
the anchoring mechanism comprises an anchoring plate positioned at a lower end of the lower body component, outside a stake pocket, and one or more anchoring assemblies for generating a compressive force between the anchoring plate and an upper region of the lower body component, the compressive force acting to vertically secure the lower body component in a stake pocket.

37. The stake post according to claim 36, wherein
the one or more anchoring assemblies are one or more nut-and-bolt assemblies.

38. The stake post according to claim 5, wherein
the lower body component comprises one or more throughholes for reception of one or more bolt assemblies for joining the stake post to an outer surface of a load platform.

39. A method of using a stake post, comprising:
installing a stake post according to claim 5 on a flatbed platform by inserting the lower body component of the stake post into a stake pocket of the flatbed platform.

40. A gate unit comprising:
two or more stake posts according to claim 5, with one or more barrier elements extending between the two or more stake posts.

41. A load retention system, comprising:
a plurality of gate units according to claim 40.

42. A load retention system, comprising:
a plurality of stake posts according to claim 5.

43. A method of transporting cargo, utilizing a flatbed platform and a plurality of stake posts according to claim 5, comprising:
loading cargo onto the flatbed platform while the plurality of stake posts are inserted in stake pockets along a periphery of the flatbed platform, wherein during said loading the upper component of at least one of the plurality of stake posts is placed in the second position;
transporting cargo on the flatbed platform, wherein during said transporting the upper body components of the plurality stake posts remain locked in the first position; and
unloading cargo from the flatbed platform while the plurality of stake posts are inserted in stake pockets along the periphery of the flatbed platform, wherein during said unloading the upper component of at least one of the plurality of stake posts is placed in the second position.

44. The method of claim 43, wherein
one or more barrier elements extend across one or more individual stake posts in the plurality of stake posts, such that each stake post having one or more barrier elements extending thereacross forms at least a part of a gate unit;
when placed in the second position, a gate unit formed from one or more individual stake posts and one or more barrier elements extending thereacross is placed in a vertically downward orientation extending downward from the flatbed platform; and
loading cargo onto the flatbed platform and/or unloading cargo from the flatbed platform further comprises a user climbing onto the flatbed platform by stepping on the one or more barrier elements in a gate unit that is placed in the second position.

45. The stake post according to claim 12, wherein
the rotation axis is secured in an upper region of the lower body component.

46. The stake post according to claim 45, wherein
the rotation axis is positioned within the lower body component, at a location inset from a forward edge of the lower body component, such that the rotation axis does not define an outer perimeter of the lower body component.

47. The stake post according to claim 46, wherein
the locking hinge is configured to enable rotation of the upper body component relative to the lower body component between a first position in a vertical upright orientation and a second position in a vertical downward orientation, with a range of motion of approximately 180° between the first and second positions.

48. The stake post according to claim 12, wherein
the upper body component is configured such that:
  when in the first position, an outward facing surface of the upper body component is positioned at an inset location from an outward facing surface of the lower body component, and
  when in the second position, an inward facing surface of the upper body component is positioned further outward of an outward facing surface of the lower body component.

49. A stake post according to claim 48, wherein
the upper body component is mounted to the rotation axis by an elongated arm, the elongated arm dimensioned such that the upper body component is rotatable between a first position where the upper body component is inset from the lower body component to a second position where the upper body component is positioned forward of the lower body component.

50. A stake post according to claim 49, wherein
the lower body component comprises a forward edge configured to abut a top surface of a side rail of a flatbed platform, the forward edge being further configured such that an outer surface thereof resides at a location substantially parallel with or inset from an outer surface of the side rail, and
the elongated arm of the upper body component is dimensioned to enable rotation of the upper body component between the first position and the second position with clearance of both the lower body component and a side rail of a stake pocket in which the lower body component is inserted.

51. The stake post according to claim 49, wherein
the locking hinge is configured to enable rotation of the upper body component relative to the lower body component between a first position in a vertical upright orientation and a second position in a vertical downward orientation, and
the elongated arm is dimensioned such that the upper body component, when in the vertical upright orientation and joined to a load platform, rests in a position to overhang an upper surface of the load platform.

52. The stake post according to claim 12, wherein
the locking hinge comprises an automated lock.

53. The stake post according to claim 52, wherein
the automated lock comprises a lever and a stop surface, the lever being mounted for pivoting between a locked position in which the lever abuts the stop surface and an unlocked position in which the lever is displaced from abutting the stop surface, and
the automated lock is configured such that, when the upper body component is in the first position, the lever rests in the locked position abutting the stop surface and the lever is selectively manually manipulable for displacement to the unlocked position.

54. The stake post according to claim 53, wherein
the lever is pivotally mounted on a lever axis secured within the upper body component, and the stop surface is formed in the lower body component such that
  when the upper body component is rotated from the first position, the lever travels with the upper body component to move away from the stop surface, and
  when the upper body component is returned to the first position, the lever returns to the locked position abutting the stop surface.

55. The stake post according to claim 52, wherein
the automated lock is a gravity lock or a spring lock.

56. The stake post according to claim 12, wherein
the lower body component comprises one or more throughholes for reception of one or more bolt assemblies for joining the stake post to an outer surface of a load platform.

57. A method of using a stake post, comprising:
installing a stake post according to claim 12 on a flatbed platform by inserting the lower body component of the stake post into a stake pocket of the flatbed platform.

58. A gate unit comprising:
two or more stake posts according to claim 12, with one or more barrier elements extending between the two or more stake posts.

59. A load retention system, comprising:
a plurality of gate units according to claim 58.

60. A load retention system, comprising:
a plurality of stake posts according to claim 12.

61. A method of transporting cargo, utilizing a flatbed platform and a plurality of stake posts according to claim 12, comprising:
loading cargo onto the flatbed platform while the plurality of stake posts are inserted in stake pockets along a periphery of the flatbed platform, wherein during said loading the upper component of at least one of the plurality of stake posts is placed in the second position;
transporting cargo on the flatbed platform, wherein during said transporting the upper body components of the plurality stake posts remain locked in the first position; and
unloading cargo from the flatbed platform while the plurality of stake posts are inserted in stake pockets along the periphery of the flatbed platform, wherein during said unloading the upper component of at least one of the plurality of stake posts is placed in the second position.

62. The method of claim 61, wherein
one or more barrier elements extend across one or more individual stake posts in the plurality of stake posts, such that each stake post having one or more barrier elements extending thereacross forms at least a part of a gate unit;
when placed in the second position, a gate unit formed from one or more individual stake posts and one or more barrier elements extending thereacross is placed in a vertically downward orientation extending downward from the flatbed platform; and
loading cargo onto the flatbed platform and/or unloading cargo from the flatbed platform further comprises a user climbing onto the flatbed platform by stepping on the one or more barrier elements in a gate unit that is placed in the second position.

* * * * *